(12) United States Patent
Kwon

(10) Patent No.: US 7,792,191 B2
(45) Date of Patent: Sep. 7, 2010

(54) DEVICE AND METHOD FOR PERFORMING HALF-PIXEL ACCURACY FAST SEARCH IN VIDEO CODING

(75) Inventor: Nyeongkyu Kwon, Victoria (CA)

(73) Assignee: Lambert Everest Ltd., Tortola (VG)

( * ) Notice: Subject to any disclaimer, the term of this patent is extended or adjusted under 35 U.S.C. 154(b) by 931 days.

(21) Appl. No.: 10/471,085

(22) PCT Filed: Mar. 8, 2002

(86) PCT No.: PCT/CA02/00324

§ 371 (c)(1),
(2), (4) Date: May 12, 2004

(87) PCT Pub. No.: WO02/071741

PCT Pub. Date: Sep. 12, 2002

(65) Prior Publication Data

US 2004/0196909 A1  Oct. 7, 2004

Related U.S. Application Data

(63) Continuation-in-part of application No. 09/801,584, filed on Mar. 8, 2001, now abandoned.

(51) Int. Cl.
*H04N 7/12* (2006.01)
*H04N 11/02* (2006.01)
*H04N 11/04* (2006.01)

(52) U.S. Cl. .............. 375/240.16; 375/240.12; 375/240.13; 375/240.14; 375/240.17; 348/416

(58) Field of Classification Search ............... 348/416; 375/240.17, 240.16, 240.12
See application file for complete search history.

(56) References Cited

U.S. PATENT DOCUMENTS 5,512,962 A * 4/1996 Homma .................. 348/699

(Continued)

FOREIGN PATENT DOCUMENTS

EP    626791 A2 * 11/1994

(Continued)

OTHER PUBLICATIONS

Lee Kyeong-Hwan et al: "Fast two-step half-pixel accuracy motion vector prediction" Electronics Letters, IEE Stevenage, GB, vol. 36, No. 7, Mar. 30, 2000, pp. 625-627, XP006015079 ISSN: 0013-5194 cited in the application the whole document.*

(Continued)

*Primary Examiner*—Marsha D Banks Harold
*Assistant Examiner*—Chikaodili E Anyikire
(74) *Attorney, Agent, or Firm*—Edward M. Roney; Quarles & Brady LLP

(57) ABSTRACT

A half-pixel accuracy fast search algorithm in video coding performs a hierarchical search method for motion estimation, which initially searches integer accuracy motion vector and then continues its search sub-pixel accuracy over surrounding reconstructed sub-pixels of the integer motion vector. The term hierarchical connotes that the algorithm first calculates a minimum integer pixel location and then performs a sub-integer pixel search. The present invention obtains the integer pixel value with the lowest MAD value and then interpolates conjugate half-pixel values in a first direction. The algorithm determines which half-pixel value yields the lowest MAD value and then interpolates conjugate half-pixel values in a second direction from the previously calculated minimum MAD half-pixel location from the first direction.

38 Claims, 10 Drawing Sheets

U.S. PATENT DOCUMENTS

| | | | | |
|---|---|---|---|---|
| 5,635,994 A | * | 6/1997 | Drexler et al. | 348/699 |
| 5,666,461 A | * | 9/1997 | Igarashi et al. | 386/95 |
| 5,818,968 A | * | 10/1998 | Yoshimoto | 382/236 |
| 5,936,672 A | * | 8/1999 | Ahnn | 375/240.17 |
| 6,011,870 A | * | 1/2000 | Jeng et al. | 382/236 |
| 6,104,439 A | * | 8/2000 | Jeong et al. | 348/699 |
| 6,118,901 A | * | 9/2000 | Chen et al. | 382/236 |
| 6,175,593 B1 | * | 1/2001 | Kim et al. | 375/240.17 |
| 6,332,002 B1 | * | 12/2001 | Lim et al. | 375/240.17 |
| 6,584,155 B2 | * | 6/2003 | Takeda et al. | 375/240.16 |
| 6,757,330 B1 | * | 6/2004 | Hsu | 375/240.17 |
| 6,765,965 B1 | * | 7/2004 | Hanami et al. | 375/240.16 |

FOREIGN PATENT DOCUMENTS

| | | |
|---|---|---|
| JP | 1233894 | 9/1989 |
| JP | 10247242 | 9/1998 |
| JP | 2000253407 | 9/2000 |

OTHER PUBLICATIONS

Kyeong-Hwan Lee et al., "Fast two-step half-pixel accuracy motion vector prediction," IET Electronic Letters, Mar. 30, 2000, vol. 36, No. 7, p. 625-627.

Remarks provided to foreign associate on Apr. 24, 2009 in response to Nov. 4, 2008 Japanese Office Action for Japanese Patent Application No. 2008-244850.

* cited by examiner

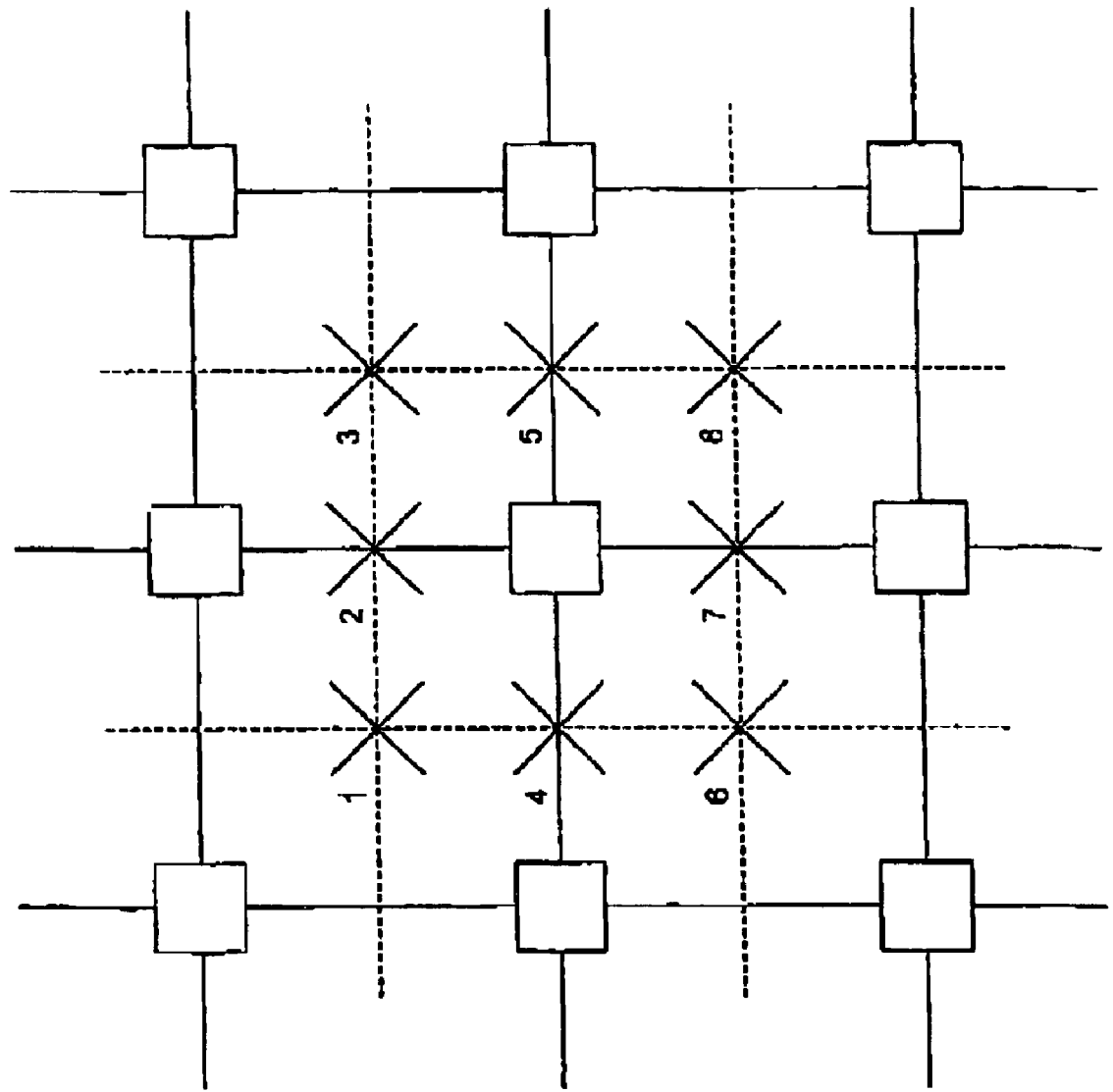
FIG. 1
(PRIOR ART)
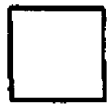 = Integer Pixel
 = Half Pixel

□ = Integer Pixel

✕ = Half Pixel

□ = Integer Pixel
✕ = Half Pixel

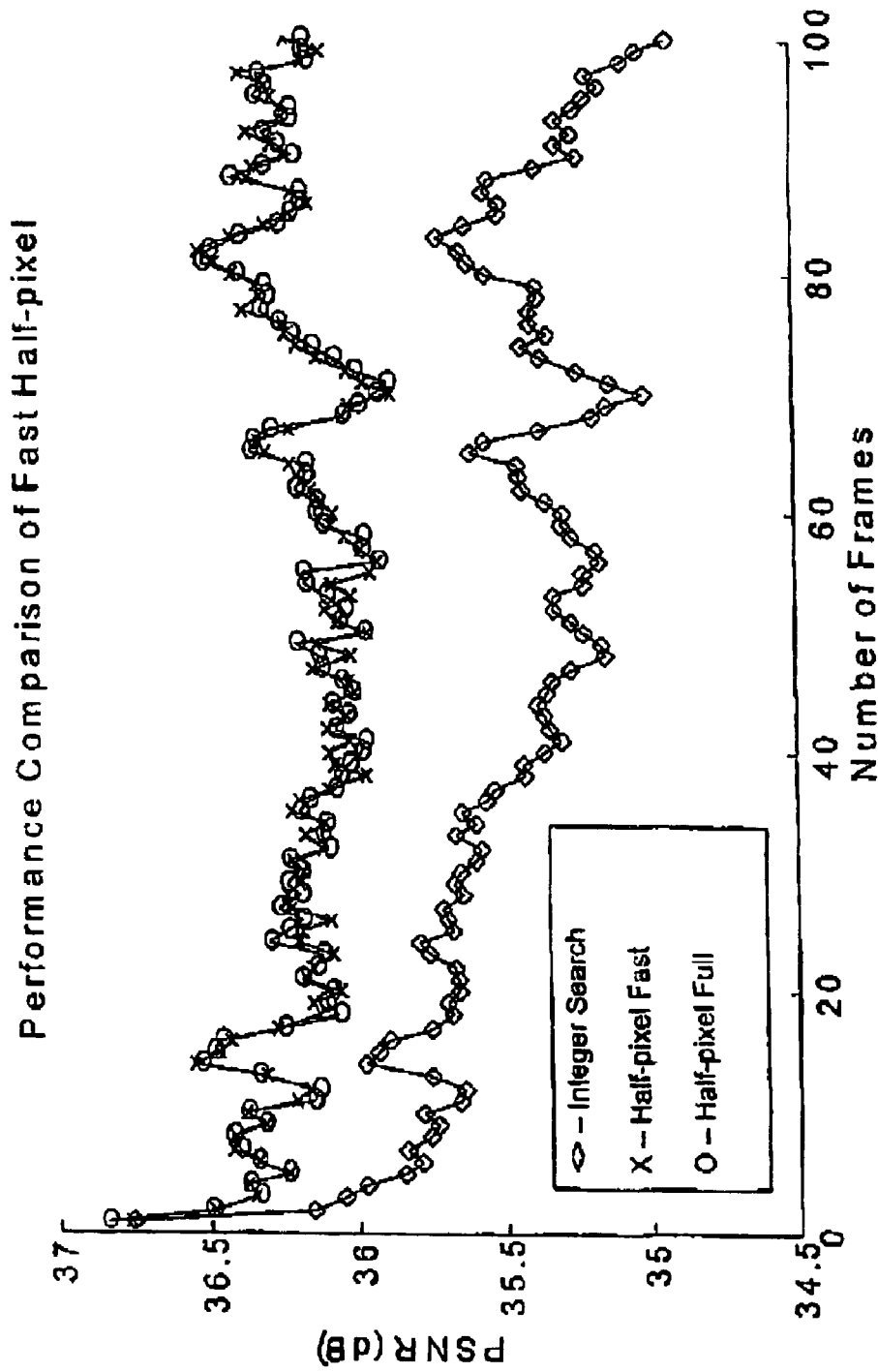
Fig.7 PSNR performance with test video stream – Claire

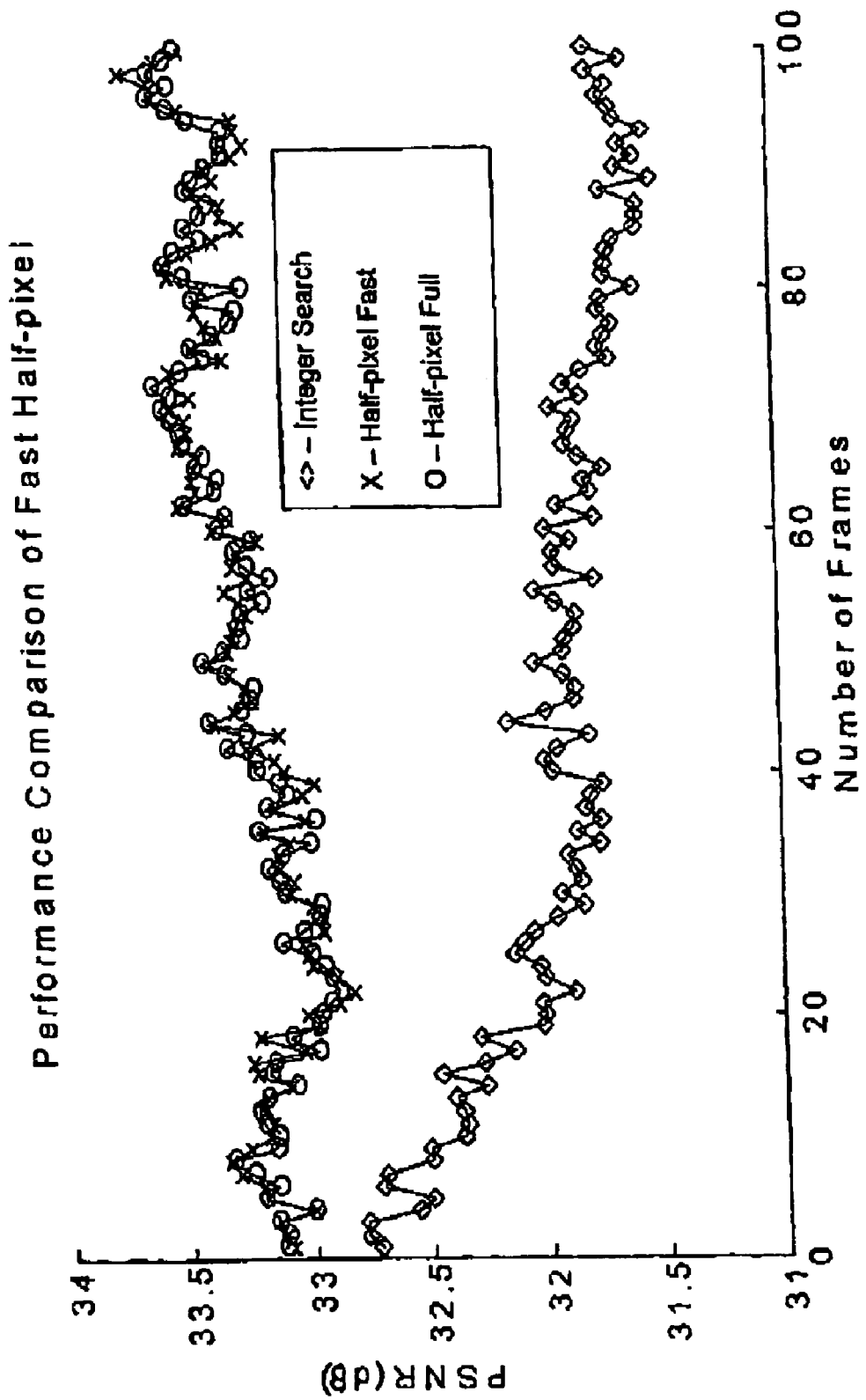
Fig.8 PSNR performance with test video stream – Carphone

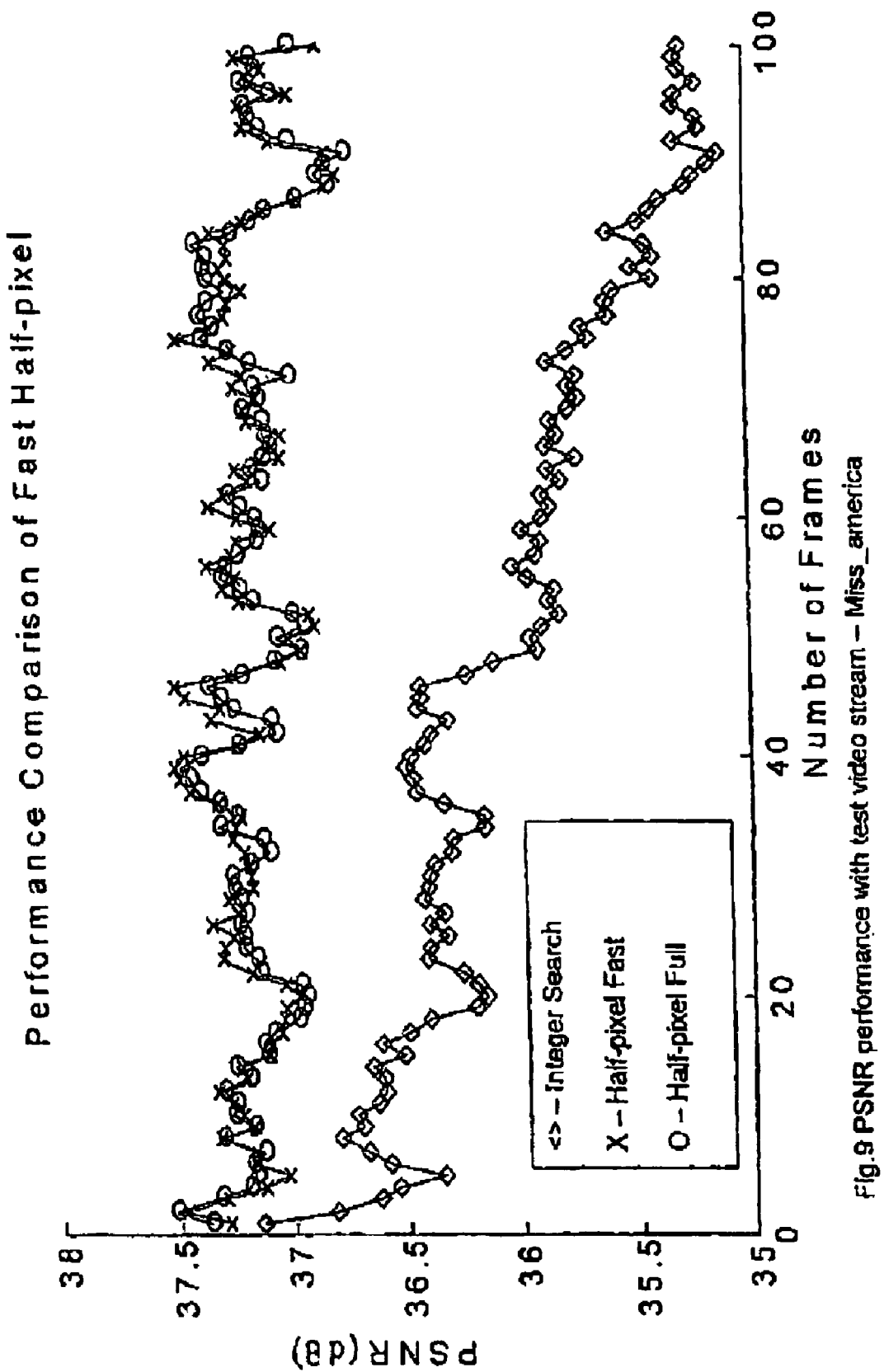
Fig.9 PSNR performance with test video stream – Miss_america

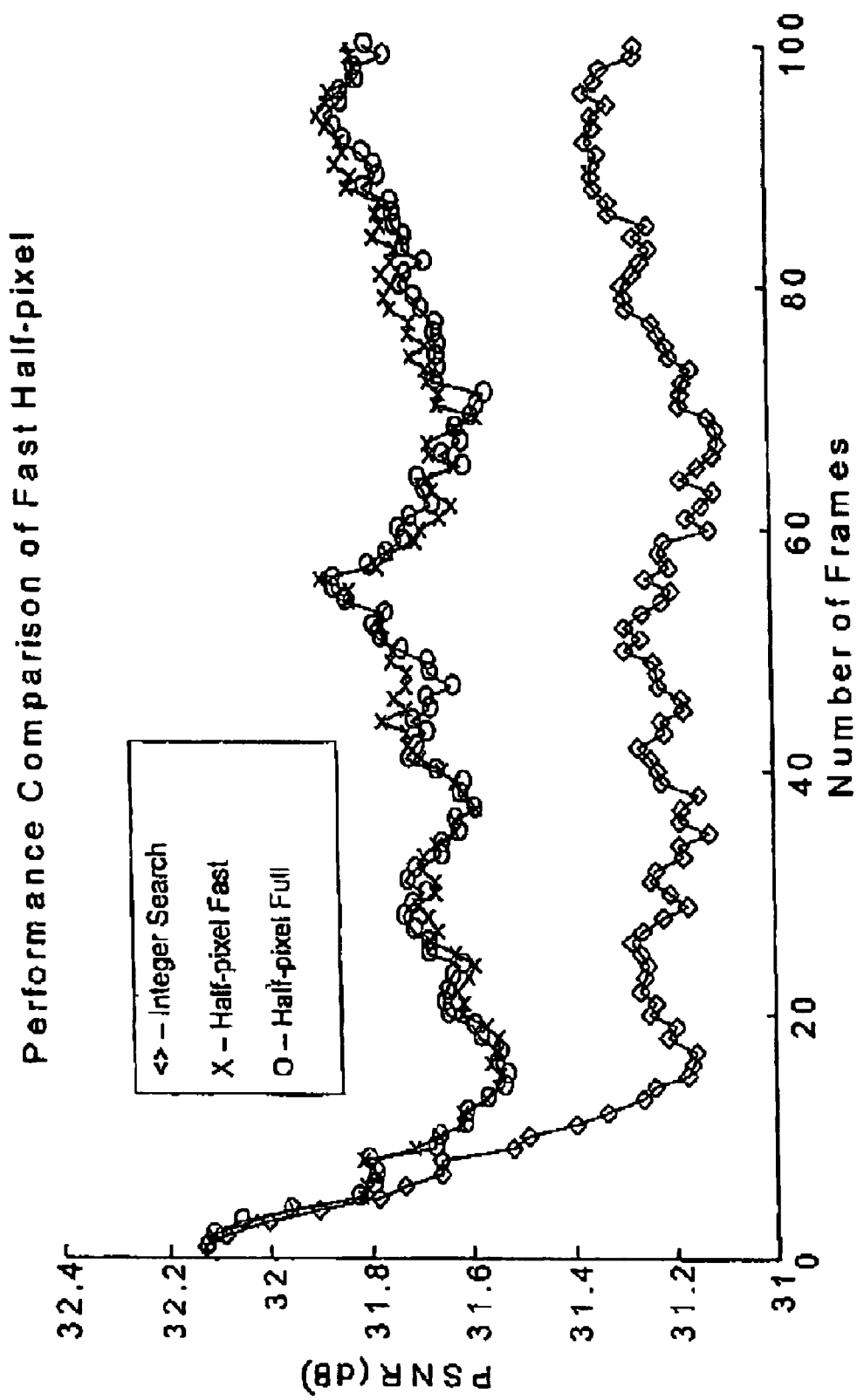
Fig.10 PSNR performance with test video stream – Salesman

DEVICE AND METHOD FOR PERFORMING HALF-PIXEL ACCURACY FAST SEARCH IN VIDEO CODING

FIELD OF THE INVENTION

The present invention relates to motion estimation algorithms for video compression and, in particular, to a device and method for performing a half-pixel accuracy fast search algorithm in video coding.

BACKGROUND OF THE INVENTION

Advancements in digital technology have produced a number of digital video applications. Digital video is currently used in digital and high definition television (HDTV), video conferencing, computer imaging, and high quality video tape recorders. Uncompressed digital video signals constitute a huge amount of data and therefore require a large amount of bandwidth and memory to store and transmit. For example, one of the formats defined for HDTV broadcasting within the United States is 1920 pixels horizontally by 1080 lines vertically, at 30 frames per second. If these numbers are all multiplied together, along with eight bits for each of the three primary colors, the total data rate required will be approximately 1.5 Gb/sec. Because of the 6 MHz channel bandwidth limitation imposed by the FCC, each channel only supports a date rate of 19.2 Mb/sec, which is further reduced to 18 Mb/sec because the channel must also support audio, transport, and ancillary data information. Given the transmission data rate restriction, the original signal must be compressed by a factor of approximately 83:1. Many digital video systems, therefore, reduce the amount of digital video data by employing data compression techniques that are optimized for particular applications. Digital compression devices are commonly referred to "encoders", while devices that perform decompression are referred to as "decoders". Devices that perform both encoding and decoding are often referred to as "codecs".

In the interests of standardizing methods for motion picture video compression, the moving picture experts group (MPEG) issued a number of standards for digital video processing.

Motion picture video sequences consist of a series of still pictures or "frames" that are sequentially displayed to provide the illusion of continuous motion. Each frame may be described as a two-dimensional array of picture elements or "pixels". Each pixel describes a particular point in the picture in terms of brightness and hue. Methods have been devised to reduce the amount of transmission data required to represent each frame. The reduction of transmission data is referred to as data compression. Rather than transmitting large amounts of information for each pixel location's color and brightness, compression methods divide each frame into a predetermined number of "macroblocks". The macroblocks are typically defined as a 16×16 array of pixels. Since there is some similarity within and between successive frames, it is more efficient to transmit only the differences between the frames if the current macroblock is found in a successive or preceding frame, it is more efficient to transmit a motion vector that details where to move the current macroblock. The motion vectors are determined by comparing each pixel location in the current macroblock with each pixel location in a successive reference frame. The integer location which differs the least between the two macroblocks is used to generate the motion vector. The process of searching every pixel location is referred to as a full or exhaustive search and the process of searching less than every pixel location is referred to as a fast search. A fast search algorithm for integer pixel locations is described in U.S. Pat. No. 6,128,047 entitled "Motion Estimation Process And System Using Sparse Search Block-Matching And Integral Projection", to Chang et al.

The current macro block does not always shift an integer number of pixels in a given direction in real world video encoding. In reality, the macro block may be displaced by a fractional portion of a pixel. Several methods exist which obtain the integer pixel location previously determined by a Full or Fast search integer pixel search algorithm and perform a second search on all 8 surrounding half-pixel locations to more accurately define the motion vector. While this yields a more accurate motion vector, there is an increase in the number of computations necessary to locate the correct half-pixel location. There exist ½ pixel search algorithms that perform a fast search. i.e., not all 8½ pixel locations are searched. One such fast search algorithm is described in "Fast Two-Step Half-Pixel Accuracy Motion Vector Prediction", K. H. Lee, J. H. Chol, B. K. Lee and D. G. Kim, *Electronics Letters*, 30 Mar. 2000 Vol. 36, no. 7. The Lee article performs a fast two-step half-pixel accuracy motion vector prediction algorithm by first determining which integer location of a macro block contains the lowest Mean of Absolute Difference (MAD). The MAD function is shown in equation (1):

$$MAD(dx, dy) = \frac{1}{256}\sum_{i=0}^{15} \sum_{j=o}^{15} |f(i, j) - g(i - dx, j - d\, y)| \tag{1}$$

where, f(i, j) represents a block of 16×16 pixels (macroblock) from the current frame, g(i, j) represents the same macroblock but from a reference frame (either previous or future in time), and the reference macroblock is displaced by a vector (dx, dy), representing the search location. The MAD function calculates which integer pixel location in a succeeding frame contains a minimum difference. This pixel value becomes the integer pixel displacement value for a motion vector.

To find the best matching block producing the minimum MAD value, we need to calculate the MAD at several locations in the search range. As mentioned previously, a full or exhaustive search calculates the MAD at all of the locations, while a fast or partial search selects predetermined values.

Referring to FIG. 1, the Lee article describes how the ½ pixel points surrounding the previously determined integer pixel location are tested. First, the surrounding half-pixel integer locations are separated into a horizontal and vertical pair Horizontal half-pixel points 2 and 7 and vertical half-pixel points 4 and 5 are interpolated based upon the surrounding integer pixel values and the MADs of location 2 as compared with location 7, and location 4 as compared with location 5 to determine a minimum MAD pair. The interpolated pixels are determined using MPEG approved bi-linear interpolation techniques. The block with the lowest MAD value is then compared with the blocks of the opposing pairs to determine a minimum pair. For example, assume that point 2 has the minimum MAD and 5 has a smaller MAD than 4, the minimum MAD pair is to be 2 and 5 and point 4 is additionally considered for half-pixel motion prediction. Finally, the half-pixel accuracy motion vector is determined by comparing the MADs of the centered integer pixel block, the minimum candidate block, and the most recently considered point.

While the Lee article describes a fast two step half-pixel motion vector prediction algorithm, the algorithm performs 5 calculations and only reduces the computational burden by 37.5% compared with that of the conventional full half-pixel search method. Accordingly, there remains a need for a fast half-pixel motion estimation algorithm which further reduces the computational burden of determining a half-pixel accuracy motion vector.

SUMMARY OF THE INVENTION

It is therefore an aspect of the present invention to provide a half-pixel accuracy fast search algorithm in video coding that reduces the computational burden of determining a motion vector having a half-pixel accuracy as compared with conventional methods.

It is an additional aspect of the present invention to provide the half-pixel accuracy fast search algorithm in video coding that is simple to implement and execute.

To achieve the above and other aspects of the present invention, there is provided a half-pixel accuracy fast search algorithm in video coding that performs a hierarchical search method for motion estimation which initially searches for an integer accuracy motion vector and then continues its search having a sub-pixel accuracy over surrounding, reconstructed conjugate sub-pixels of the integer motion vector.

BRIEF DESCRIPTION OF THE DRAWINGS

Other aspects and features of the present invention will become more apparent from the following detailed description considered in connection with the accompanying drawings which disclose an embodiment of the present invention. It should be understood, however, that the drawings are designed for the purpose of illustration only and not as a definition of the limits of the invention. In the drawings, wherein similar reference characters denote similar elements throughout the several views:

FIG. 1 is a graphical depiction of integer pixel and half-pixel locations according to the prior art;

FIGS. 7-10 are graphical representations of the peak signal to noise ratio (PSNR) performance of the present invention with test video stream inputs.

DETAILED DESCRIPTION OF THE PREFERRED EMBODIMENTS

Figure 2:
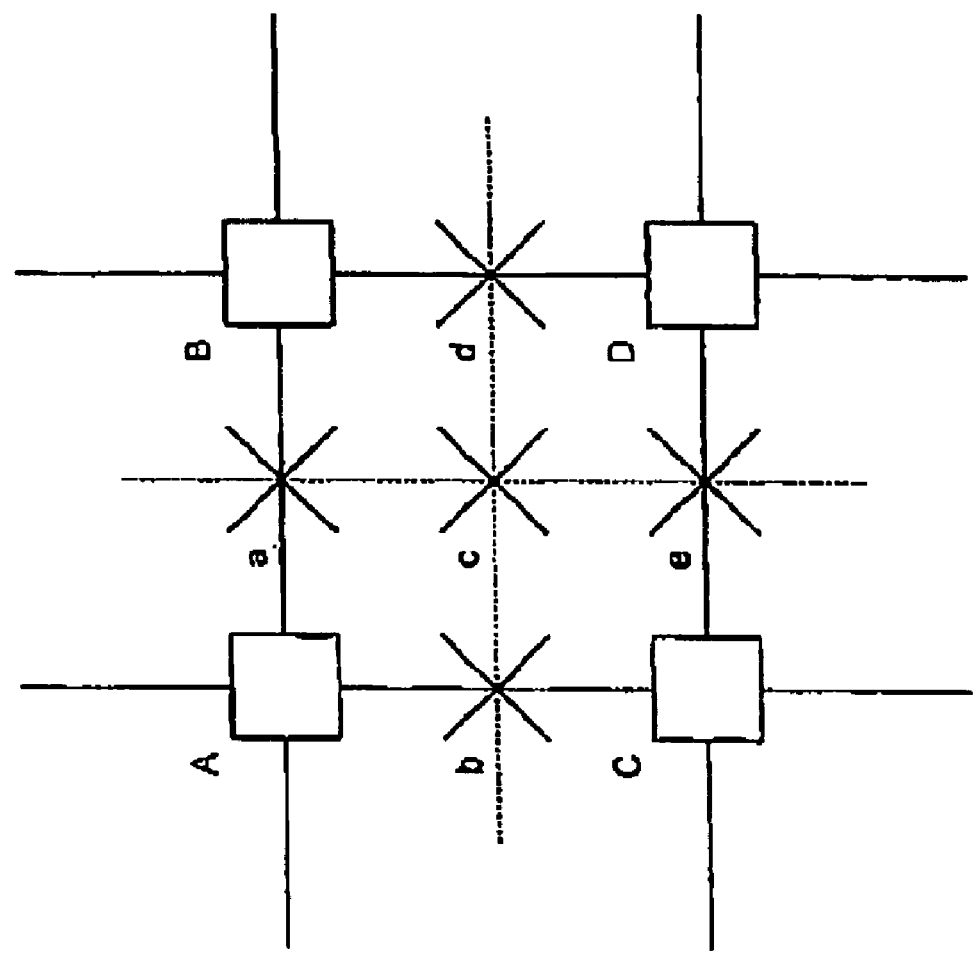
FIG. 2 is a graph depicting integer and half integer locations for interpolation.

Motion picture video sequences consist of a series of still pictures or "frames" that am sequentially displayed to provide the illusion of continuous motion. Each frame may be described as a two-dimensional array of picture elements, or "pixels". Each pixel describes a particular point in the picture in terms of brightness and hue. Pixel information can be represented in digital form and displayed on a monitor such as a High Definition television, or encoded, and broadcast.

There are two components of a broadcast signal: 1) those which can not be anticipated (i.e. they are novel and unpredictable), and 2) those which can be anticipated. The novel component is called entropy and it is the true information in the signal. The remainder is called redundancy because it is not essential and may be recreated from other frames. Redundancy may be spatial, as it is in large plain areas of the picture where adjacent pixels have almost the same value. Redundancy can also be temporal, as it is where similarities between successive pictures are used. Compression systems work by separating the entropy from the redundancy in the encoder. The entropy is recorded or transmitted along with motion vectors which describe redundant data. The decoder uses the entropy data and redundancy data to generate complete frames to display.

An ideal encoder transmits the entropy of a sequence of frames and recreates the additional redundant information using previous or subsequent frames of redundant pixel information without any loss of image quality. Typically, the higher the compression ratio, the more prone the signal transmission is to digital artifacts or errors, thus reducing signal quality. Since ideal encoders do not presently exist, there is a balancing between compression ratio and signal quality.

For video compression, the encoder makes use of both "intracoding" and "intercoding" techniques. Intracoding is a technique that exploits spatial redundancy, or redundancy within the picture while interceding is a technique that exploits temporal redundancy, or redundancy between successive pictures. If a given picture is available at the decoder, the next picture may be created by sending only the picture differences. The picture differences will be increased when objects are moved, but the differences can be offset by using motion compensation, since a moving object does not generally change its appearance very much from one picture to the pixel if the motion can be measured, a closer approximation to the current picture can be created by shifting part of the previous picture to a new location. The shifting processes are controlled by a motion vector that is transmitted to the decoder. The motion vector transmission requires less data than sending the picture difference data or the complete frame.

Two types of motion estimation methods are typically used to estimate the motion vectors; pixel-recursive algorithms and block-matching algorithms. Pixel-recursive techniques predict the displacement of each pixel from corresponding pixels in neighboring frames. Block matching algorithms, on the other hand, estimate the displacement between frames on a block-by-block basis and choose displacement vectors that minimize the difference. The entire macroblock is then displaced by the motion vector. Typically, the current image to be encoded is divided into equally sized blocks of pixel information. These "macro blocks" typically consist of a 16×16 sample array of luminance samples together with 1 8×8 block of samples for each of the two chrominance components.

Block matching motion estimation algorithms are generally categorized as either a full search or a fast search algorithm based on its search strategy. Full search, also known as the exhaustive search, computes the error between successive macro blocks at all possible candidate integer pixel locations in order to find the motion vector of the macro block. While it is simple in complexity to implement, it carries an extensive computational burden to search the entire area of each macro block and successive macro block locations. Hence, many fast search algorithms have been proposed that reduce the amount of integer pixel locations to search for a minimum error between successive macro blocks. In order to improve the accuracy of integer pixel motion vectors, the present invention proposes a hierarchical approach having sub-pixel accuracy.

The term hierarchical connotes that the algorithm first calculates a minimum integer pixel location and then performs a sub-integer pixel search. The present invention obtains the integer pixel value with the lowest MAD value and then interpolates conjugate half-pixel values in a first direction. The algorithm determines which half-pixel value yields the lowest MAD value and then interpolates conjugate half-pixel values in a second direction from the previously calculated minimum MAD half-pixel location from the first direction. This conjugate search method described reduces the calculations performed by the conventional half-pixel search methods from eight to four half-pixel locations.

A two-dimensional reconstructed image using interpolation is described in a mathematical expression as follows, where two-dimensional convolution is conducted between sampled pixel image and interpolation function.

$$B(x,y) = \Sigma \overline{B}(x_k, y_k) h(x - x_k, y - y_k)$$

where B(.) is the reconstructed interpolation image and $\overline{B}$(.) and h(.) are sampled pixel image and interpolation filter function respectively. Two-dimensional liner interpolation function is given by $$b(x, y) = \left(1 - \left|\frac{x}{X}\right|\right) \cdot \left(1 - \left|\frac{y}{Y}\right|\right), \text{ for both } \left|\frac{x}{X}\right| \text{ and } \left|\frac{y}{Y}\right| \leq 1$$

where X and Y are the horizontal and vertical spacing in the image frame.

Turning now in detail to the drawings, FIG. 2 is a graph depicting integer and half integer locations for use with bilinear interpolation. Bilinear interpolation is a process by which half-pixel values are determined and has been adopted by MPEG as the standard for calculating half-pixel values. Using the above bilinear interpolation equation on integer-pixel locations of an image, half-pixel values a, b, c, d and e are calculated as follows.

$$a = (A+B)/2$$

$$b = (A+C)/2$$

$$c = (A+B+C+D)/4$$

$$d = (B+D)/2$$

$$e = (C+D)/2$$

where A, B, C, and D are integer-pixels and a, b, c, d, and e are surrounding half-pixels. The half pixel values are used by the present invention in determining a half pixel accuracy motion vector.

Figure 3:
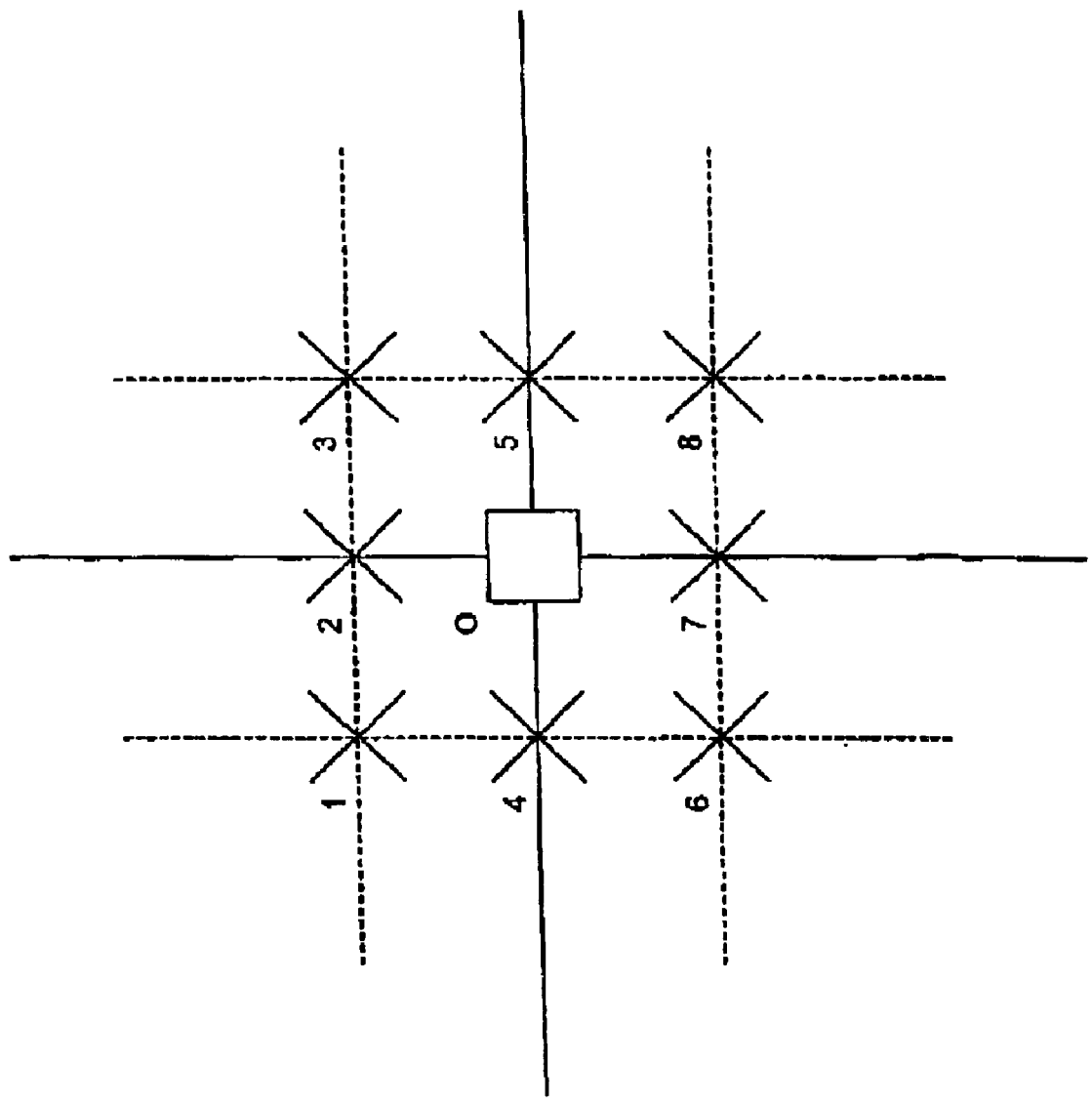
FIG. 3 is a graphical depiction of the surrounding half-pixel locations around an integer pixel location.

FIG. 3 is a graphical representation of the surrounding half-pixel locations around an integer pixel location. In accordance with the present invention, half-pixel locations 1 through 8 which surround an integer pixel location zero are calculated using, for example, the formulas previously described.

Figure 4:
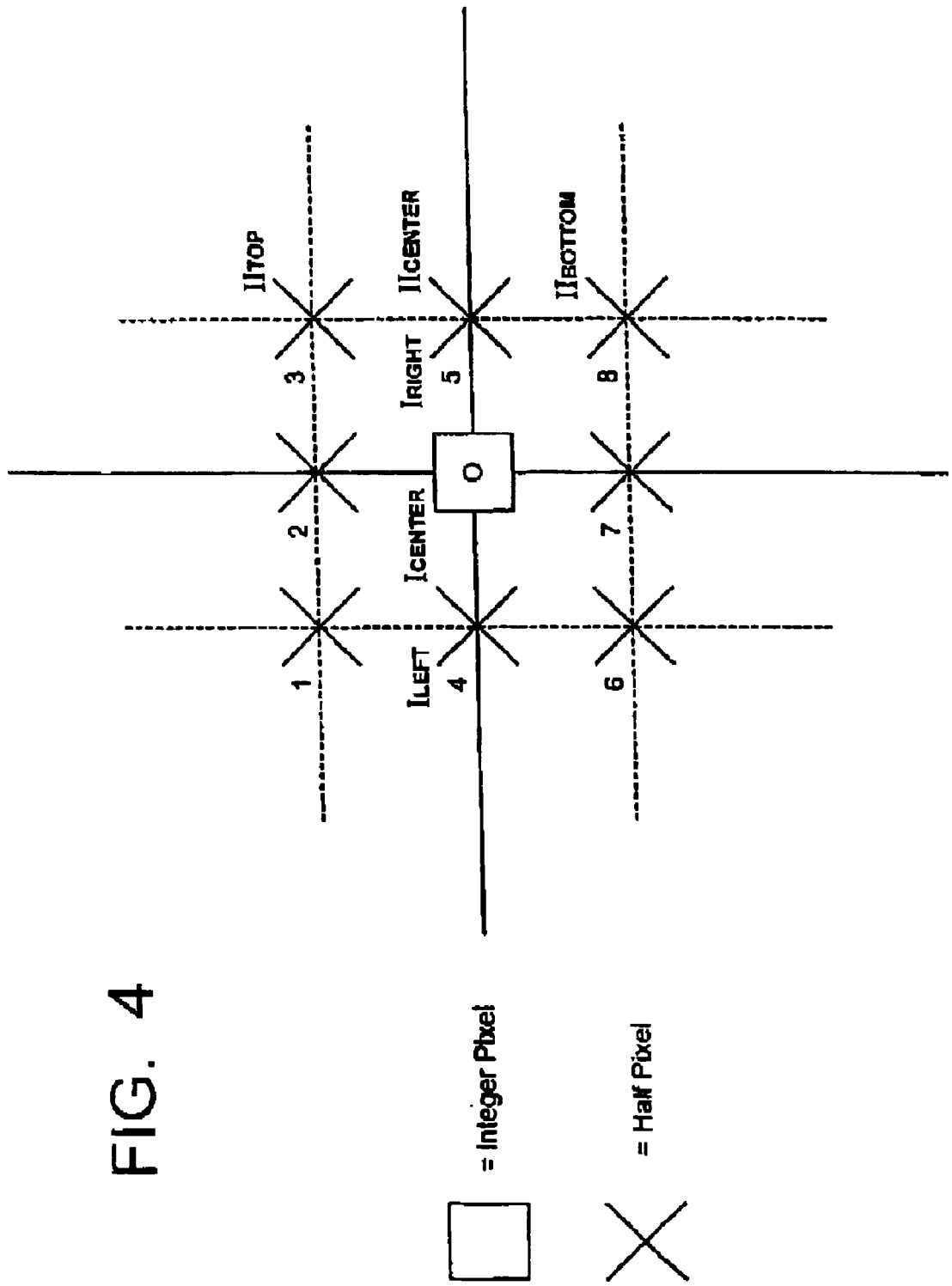
FIG. 4 is a graphical representation of the half-pixel accuracy fast search algorithm according to the present invention.

FIG. 4 shows a graphical representation of an integer location zero surrounded by multiple half-pixel locations 1 through 8 respectively. In addition, an example of possible search locations for the half-pixel accuracy fast search algorithm in video coding according to the present invention are described with reference to $I_{Left}$, $I_{Center}$, $I_{Right}$, and $II_{Center}$, $II_{Top}$, and $II_{Bottom}$.

The fast half-pixel search according to the present invention first calculates an integer pixel location in a macroblock which has a minimum MAD value using a known integer pixel full or fast search algorithm. Once that integer pixel location is calculated, the conjugate half-pixel values in a first direction $I_{Left}$ and $I_{Right}$ are determined. For example, assume the first direction is horizontal and parallel to an X-axis of a 2 dimensional grid. The MADs of $I_{Left}$ and $I_{Right}$ are calculated and the half-pixel location with the lowest MAD value is stored. Conjugate half-pixel values in a second direction are also calculated starting from the previously stored pixel location having the lowest MAD value. Based upon the above, presume the second direction is in a vertical direction and parallel to a y-axis of a grid. Thus, although not required, in this case, the first and second directions are perpendicular to each other. Using bilinear interpolation, $II_{Top}$ and $II_{Bottom}$ are determined. Note that $I_{Right}$ $I_{Center}$ or $I_{Left}$ will be equal in value to $II_{Center}$ when the first and second directions are perpendicular to each other. Once $II_{Top}$ and $II_{Bottom}$ have been calculated, MAD values for those two locations are determined. The half-pixel location having the lowest MAD value is also stored and used as an offset for the integer pixel value previously determined. Accordingly, a new motion vector combining integer pixel location $I_{Center}$ plus the half-pixel location having the minimum MAD value are used to generate a final motion vector for displacing the macroblock. Using equation (2) the motion vector MV(x, y) is defined as:

$$MV(x,y) = MV_{integer}(x,y) + d_h(x,y) \qquad (2)$$

where $MV_{integer}$(x, y) is the integer accuracy motion vector and $d_h$(x, y) is the half-pixel displacement.

In an alternative approach, the method may also compare the integer location with the conjugate sub-pixel locations to determine the location having the lowest MAD value.

Advantageously, a half-pixel motion estimation algorithm operating according to the present invention yields more accurate motion displacement information than an integer pixel motion vector and reduces the computations required in a full search from 8 to 4, thereby reducing the computations by 50%.

By way of example, referring to FIG. 4, suppose the integer pixel location having the minimum MAD value is located at $I_{Center}$. The present invention interpolates half-pixel locations $I_{Left}$ and $I_{Right}$, and determines which of those two points yields a minimum MAD value. Assuming $I_{Right}$ yields the minimum MAD value, half-pixel values $II_{Top}$ and $II_{Bottom}$, are calculated in a second direction. Assuming $II_{Top}$ contains a minimum MAD value, the resulting motion vector for this macroblock would be equal to the motion vector of the integer plus the half-pixel $II_{Top}$ motion vector, it should be understood, that Fe search order employed in the example above is for illustration purposes only. Any other suitable search order could be used as an alternative, for example, the search could be performed in a vertical direction followed by a horizontal direction, the particular order being a matter of design choice. In another example, the first direction could be diagonally from top right to bottom left and the second direction could be from bottom right to top left. The conjugate values being determined with respect to the diagonals.

Figure 5:
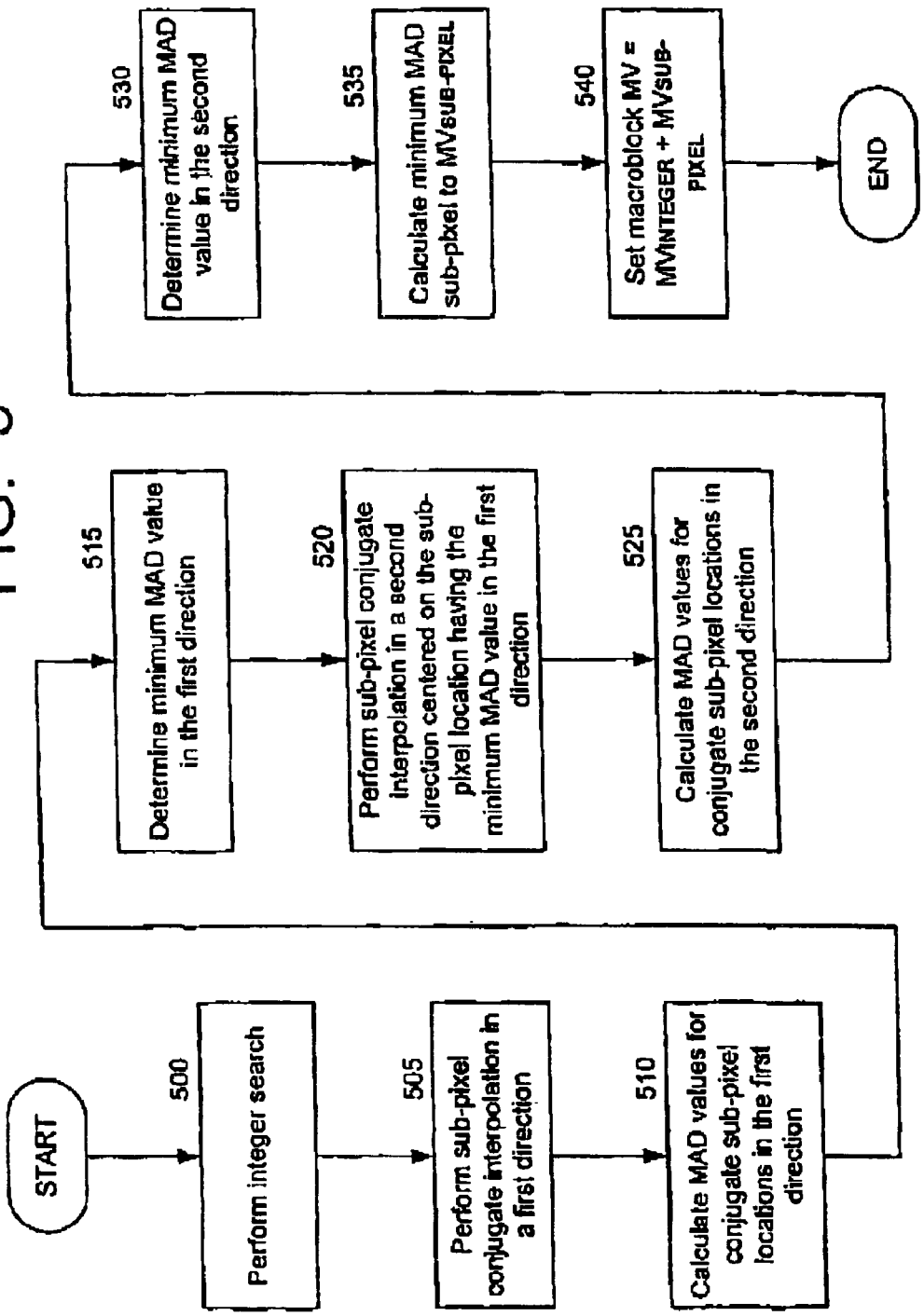
FIG. 5 is a flow chart illustrating the half-pixel accuracy fast search algorithm in video coding according to the present invention.

FIG. 5 is a flow chart illustrating a half-pixel accuracy fast search in a video coding example according to the present invention. First, perform an initial integer search using a previously known integer search algorithm and determine the motion vector MV integer (x, y). (Step 500). Following, perform a sub-pixel conjugate interpolation in a first direction. (Step 505). Then, calculate MAD values for each of the conjugate sub-pixel locations in the first direction D(x+1, y), and D(x−1, y), where the second direction variable y is fixed. (Step 510). Next determine a minimum MAD value in the first direction. (Step 515). Following, perform sub-pixel conjugate interpolation in a second direction centered on the sub-pixel location having the mini mum MAD value in the first direction. (Step 520). Next, calculate MAD values for the conjugate sub-pixel locations in the second direction D(x, y+1) and D(x, y−1) where the x variable is fixed. (Step 525) Next, determine the minimum MAD value in the second direction. (Step 530) Calculate a new motion vector based upon the sub-pixel location having the minimum MAD value. (Step 535) Then, set the motion vector for the macroblock equal to the sum of the motion vector for the integer pixel plus the motion vector for the sub-pixel location. (Step 540).

Figure 6:
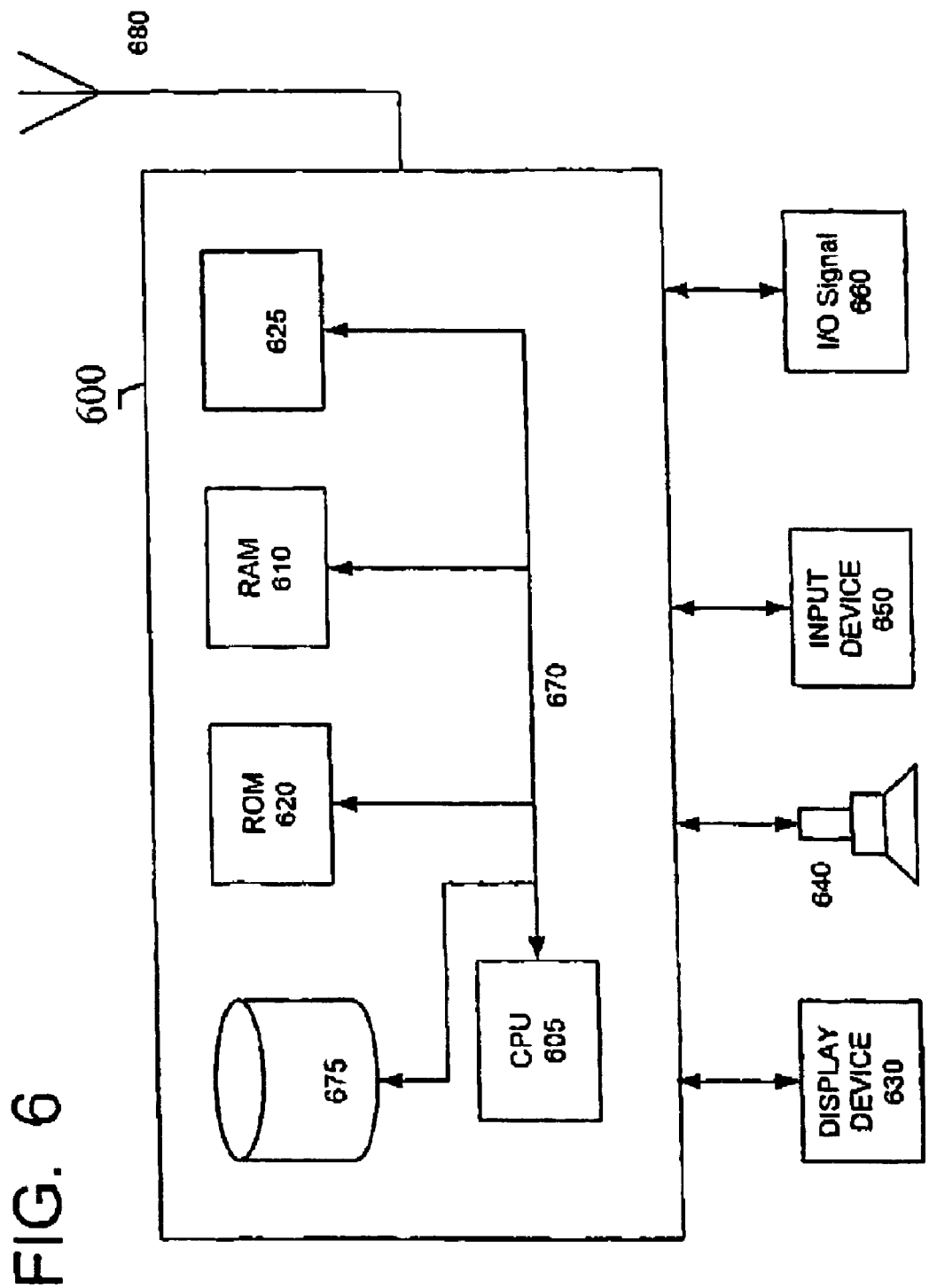
FIG. 6 is a diagram of a system consistent with the present invention.

FIG. 6 is a diagram of a system 600 consistent with the present invention System 600 is comprised of a central processing unit ("CPU") 605, a random access memory ("RAM") 610, a read only memory ("ROM") 620 and a computer readable medium 625 interconnected via a system bus 670. Computer readable medium 625 contains computer readable instructions necessary to perform the half-pixel accuracy fast search according to the present invention and may be embodied as, but not limited to, any media that provides instructions according to the present invention to CPU 605 for execution. Examples of computer readable medium may be RAM, ROM, Electrically Erasable Programmable ROM ("EEPROM"), CD-ROM, or transmission medium such as Network connections, Radio Waves, or other wireless information transmission means.

An input/output (I/O) signal 660 is connected to system 600 and may provide an input stream of Audio/Video data to compress or decompress. CPU 605 accesses I/O signal 660 along with instructions contained in medium 625 to determine the correct half-pixel accuracy motion vectors as described above. In addition, CPU 605 may receive image data from an input device 650 or display I/O signal 660 on a display 630. Once the image data is received via input device 650 or 110 signal 660 and processed via CPU 605, the image data can be either stored on a storage device 675 or transmitted via a transmitter and antenna 680.

System 600 as well as medium 625 may be incorporated into many devices including, but not limited to, Motion video recorders, Digital Video Disk recorders ("DVDs"), Satellite and television transmitters and receivers, Video Display cards for personal computers and other MPEG compliant devices, to reduce the amount of information required to transmit digital video information and reduce the amount of calculations required to obtain accurate motion vectors.

The performance of the present invention is described in terms of peak signal to noise ratio (PSNR) using four test video sequences such as "Claire", "Carphone", "Miss-America", and "Salesman", and compared to both the conventional half-pixel search and integer-pixel search method. Equation (3) details the calculation of the PSNR while Table 1 shows the computer simulation data and its comparison to other search algorithm in terms of PSNR. The simulation was performed in a H.263 framework and PSNR data was obtained by averaging over 100 picture frame data, PSNR was calculated as follows.

$$PSNR = 10\log\frac{255^2}{\frac{1}{N}\sum_{i=1}^{N}(O_i - R_i)^2} \quad (3)$$

where N is the number of pixels, and $O_i$ and $R_i$ are the amplitudes of the original and the reconstructed pixels. Both half-pixel search methods show better performance with the difference of up to 2 dB in average PSNR compared to the integer-pixel search method. In comparison of both half-pixel search methods, those methods, fast and full search, do not show much difference in terms of PSNR with all of four video sequences, while the required number of computation as described in the present invention was reduced to half of the full search method.

Table 2 shows the computer simulation data of the present invention with comparison to integer-pixel full search, fast search, and half-pixel full search in terms of the number of computations. The processing speed improvement of the present invention is dearly shown in the simulation data, especially when it is involved in integer-pixel fast search algorithm. The portion of total half-pixel search points is approximately 1% of the total number of points searched during an integer-pixel full search. The number of computations performed during the conventional half-pixel full search becomes even larger than the one of integer-pixel fast search. Hence, from the point of processing speed improvement, it is critical to reduce the number of computations in the half-pixel search. Table 1 indicates that the present invention improved the processing speed by reducing the number of required. The simulation data shows about 30% reduction in the overall number of computations required and a 50% reduction compared to the conventional half-pixel full search.

TABLE 1

Performance comparison in PSNR

|  | Integer Pixel Search(dB) | Half-pixel Full Search(dB) | Half-pixel Fast Search(dB) |
|---|---|---|---|
| Claire | 35.486 | 36.201 | 36.199 |
| Carphone | 31.933 | 33.255 | 33.245 |
| Miss-America | 36.012 | 37.159 | 37.171 |
| Sales-man | 31.289 | 31.708 | 31.716 |

TABLE 2

Performance comparison in number of computations

|  | Integer-pixel Full Search | Integer-pixel Fast Search | Half-pixel Full Search | Half-pixel Fast Search |
|---|---|---|---|---|
| Claire | 77439 | 461 | 792 | 396 |
| Carphone | 77439 | 534 | 791 | 396 |
| Miss-America | 77439 | 472 | 792 | 396 |
| Sales-man | 77439 | 464 | 792 | 396 |

FIGS. 7-10 present the PSNR data of each picture frame from 100 frames with four test video sequences. The full half pixel search, the fast half pixel search according to the present invention and the integer pixel search are compared in each of the graphs. The full half pixel search and the fast half pixel search according to the present invention are almost overlapping each other showing similar performance with respect to the PSNR, however, the integer pixel search, remains below the other two fast search data with up to 2 dB PSNR difference. Therefore, the present invention reduces the number of computations required to generate a half-pixel accurate motion vector by 50% while experiencing only a negligible amount of noise as compared to the full half pixel search.

While an embodiment of the present invention has been shown and described, it is to be understood that many changes and modifications may be made thereunto without departing from the spirit and scope of the present invention as defined in the appended claims.

What is claimed is:

1. In an apparatus for determining motion estimation between successive video frames, the apparatus including a data processing unit, a machine-implemented method of obtaining a motion vector having sub-integer pixel accuracy representing the displacement between a first macroblock contained in a first frame of video image data and a second macroblock contained in a second frame of video image data comprising:

determining an integer pixel location having a lowest mean of absolute difference ("MAD") value in said second frame relative to said first frame;

determining a first offset, relative to said integer pixel location, in a first direction to a first minimum MAD location having a lowest first direction MAD value;

determining a second offset, relative to said integer pixel location, in a second direction to a second minimum MAD location having a lowest second direction MAD value; and determining said motion vector using said integer pixel location and a sub-integer pixel location, wherein said sub-integer pixel location is obtained by combining said first and said second offsets and without using offsets other than said first and said second offsets, and without determining values for sub-integer pixel locations other than those associated with determining said first and said second offsets.

2. The machine-implemented method according to claim 1, wherein determining a first offset further comprises:

performing interpolation to determine a half-pixel value at each of a first and a second half-pixel locations in said first direction relative to said integer pixel location, wherein said first and said second half-pixel values are conjugally related;

determining a MAD value at each of said first and said second half-pixel locations;

comparing said MAD values of said first and said second half-pixel locations and said integer pixel location to determine said first minimum MAD location; and calculating said first offset as the difference between said first minimum MAD location and said integer pixel location.

3. The machine-implemented method according to claim 1, wherein determining a second offset further comprises:

performing interpolation to determine a half-pixel value at each of a third and a fourth half-pixel locations in said second direction relative to said integer pixel location, wherein said third and said fourth half-pixel values are conjugally related;

determining a MAD value at each of said third and said fourth half-pixel locations;

comparing said MAD values of said third and said fourth half-pixel locations and said integer pixel location to determine said second minimum MAD location; and calculating said second offset as the difference between said second minimum MAD location and said integer pixel location.

4. The machine-implemented method according to claim 1, wherein determining said motion vector further comprises:

generating an integer motion vector using said integer pixel location;

generating a sub-integer motion vector using said sub-integer pixel location; and generating said motion vector by adding said integer motion vector to said sub-integer motion vector.

5. The machine-implemented method according to claim 1, wherein said first direction is horizontal and parallel to an x-axis and said second direction is vertical and parallel to a y-axis, said x-axis and said y-axis are coordinate axes of a two-dimensional matrix.

6. The machine-implemented method according to claim 1, wherein said first direction is orthogonal to said second direction.

7. An apparatus for obtaining a motion vector having sub-integer pixel accuracy representing the displacement between a first frame of video image data and a second frame of video image data comprising:

a processor interconnected with a computer-readable medium encoded with computer-executable instructions, said computer-executable instructions configured, when executed by said processor, to access video image data and to perform:

determining an integer pixel location having a lowest mean of absolute difference ("MAD") value in said second frame relative to said first frame;

determining a first offset in a first direction, relative to said integer pixel location, to a first minimum MAD location having a lowest first direction MAD value;

determining a second offset in a second direction, relative to said integer pixel location, to a second minimum MAD location having a lowest second direction MAD value; and determining said motion vector using said integer pixel location and a sub-integer pixel location, wherein said sub-integer pixel location is obtained by combining said first and said second offsets and without using offsets other than said first and said second offsets, and without determining values for sub-integer pixel locations other than those associated with determining said first and said second offsets.

8. The apparatus according to claim 7, wherein said computer-executable instructions when executed by said processor to identify said first offset further comprise:

performing interpolation to determine a half-pixel value at each of a first and a second half-pixel locations in said first direction relative to said integer pixel location, wherein said first and said second half-pixel values are conjugally related;

determining a MAD value at each of said first and said second half-pixel locations;

comparing said MAD values of said first and said second half-pixel locations and said integer pixel location to determine said first minimum MAD location; and calculating said first offset as the difference between said first minimum MAD location and said integer pixel location.

9. The apparatus according to claim 7, wherein said computer-executable instructions when executed by said processor to identify said second offset further comprise:

performing interpolation to determine a half-pixel value at each of a third and a fourth half-pixel locations in said second direction relative to said integer pixel location, wherein said third and said fourth half-pixel values are conjugally related;

determining a MAD value at each of said third and said fourth half-pixel locations;

comparing said MAD values of said third and said fourth half-pixel locations and said integer pixel location to determine said second minimum MAD location; and calculating said second offset as the difference between said second minimum MAD location and said integer pixel location.

10. A computer-readable medium encoded with computer-executable instructions for obtaining a motion vector having sub-integer pixel accuracy representing the displacement between a first macroblock contained in a first frame of video image data and a second macroblock contained in a second frame of video image data, said computer-executable instructions comprising:
a component configured to determine, with respect to an integer pixel location having a lowest mean of absolute difference ("MAD") value in said second frame relative to said first frame, a first offset in a first direction, relative to said integer pixel location, to a first minimum MAD location having a lowest first direction MAD value;
a component configured to determine a second offset in a second direction, relative to said integer pixel location, to a second minimum MAD location having a lowest second direction MAD value; and
a component configured to determine said motion vector using said integer pixel location and a sub-integer pixel location, wherein said sub-integer pixel location is obtained by combining said first and said second offsets and without using offsets other than said first and said second offsets, and without determining values for sub-integer pixel locations other than those associated with determining said first and said second offsets.

11. The computer-executable instructions according to claim 10, wherein said component configured to identify said first offset further comprises:
a component configured to perform interpolation to determine a half-pixel value at each of a first and a second half-pixel locations in said first direction relative to said integer pixel location, wherein said first and said second half-pixel values are conjugally related;
a component configured to determine a MAD value at each of said first and said second half-pixel locations;
a component configured to compare said MAD values of said first and said second half-pixel locations and said integer pixel location to determine said first minimum MAD location; and
a component configured to calculate said first offset as the difference between said first minimum MAD location and said integer pixel location.

12. The computer-executable instructions according to claim 10, wherein said component configured to identify said second offset further comprises:
a component configured to perform interpolation to determine a half-pixel value at each of a third and a fourth half-pixel locations in said second direction relative to said integer pixel location, wherein said third and said fourth half-pixel values are conjugally related;
a component configured to determine a MAD value at each of said third and said fourth half-pixel locations;
a component configured to compare said MAD values of said third and said fourth half-pixel locations and said integer pixel location to determine said second minimum MAD location; and
a component configured to calculate said second offset as the difference between said second minimum MAD location and said integer pixel location.

13. A device for obtaining a motion vector having sub-integer pixel accuracy representing the displacement between a first macroblock contained in a first frame of video image data and a second macroblock contained in a second frame of video image data comprising:
at an integer pixel location having a lowest mean of absolute difference ("MAD") value in the second frame relative to the first frame, a component configured to determine a first offset in a first direction, relative to said integer pixel location, having a lowest first direction MAD value;
a component configured to determine a second offset in a second direction, relative to said integer pixel location, having a lowest second direction MAD value; and
a component configured to determine said motion vector using said integer pixel location and a sub-integer pixel location, wherein said sub-integer pixel location is obtained by combining said first offset and said second offset and without using offsets other than said first and said second offsets, and without determining values for sub-integer pixel locations other than those associated with determining said first and said second offsets.

14. The device according to claim 13, wherein said component configured to determine a first offset further comprises:
a component configured to perform interpolation to determine a half-pixel value at each of a first and a second half-pixel locations in said first direction relative to said integer pixel location, wherein said first and said second half-pixel values are conjugally related;
a component configured to determine a MAD value at each of said first and said second half-pixel locations; and
a component configured to compare said MAD values of said first and said second half-pixel locations and said integer pixel location to determine said first minimum MAD location.

15. The device according to claim 13, wherein said component configured to determine a second offset further comprises:
a component configured to perform interpolation to determine a half-pixel value at each of a third and a fourth half-pixel locations in said second direction relative to said integer pixel location, wherein said third and said fourth half-pixel values are conjugally related;
a component configured to determine a MAD value at each of said third and said fourth half-pixel locations; and
a component configured to compare said MAD values of said third and said fourth half-pixel locations and said integer pixel location to determine said second minimum MAD location, and without determining values for sub-integer pixel locations other than those associated with determining said first and said second offsets.

16. A fast search method for obtaining a motion vector having half-pixel accuracy representing the displacement between successive frames of video image data, comprising:
determining a first macroblock of a first frame comprising a plurality of pixels arranged in a two-dimensional array;
selecting a second macroblock of a second frame comprising a plurality of pixels arranged in a two-dimensional array having the lowest mean of absolute differences ("MAD") value between said first and said second macroblocks;
determining an integer pixel location having the lowest MAD value in said second macroblock;
calculating a half-pixel value at each of a first and a second half-pixel locations in a first direction relative to said integer pixel location, wherein said first and said second half-pixel values are conjugally related;
determining a MAD value at each of said first and said second half-pixel locations;
comparing said MAD values of said first and said second half-pixel locations and said integer pixel location to determine a first minimum MAD location having a lowest first direction MAD value;

calculating a half-pixel value at each of a third and a fourth half-pixel locations in a second direction relative to said first minimum MAD location, wherein said third and said fourth half-pixel values are conjugally related;

determining a MAD value at each of said third and said fourth half-pixel locations;

comparing said MAD values of said third and said fourth half-pixel locations and said first minimum MAD location to determine a second minimum MAD location having a lowest second direction MAD value; and determining said motion vector using said integer pixel location and a sub-integer pixel location, wherein said sub-integer pixel location is said second minimum MAD location.

17. The fast search method according to claim 16, wherein said determining said motion vector further comprises:

generating an integer motion vector using said integer pixel location;

generating a sub-integer pixel motion vector using said sub-integer pixel location; and generating said motion vector by adding said integer pixel motion vector to said sub-integer pixel motion vector.

18. The fast search method according to claim 16, wherein said first direction is in a horizontal direction parallel to an x-axis and said second direction is in a vertical direction parallel to a y-axis of said two-dimensional array.

19. The fast search method according to claim 16, wherein said calculating said half-pixel values further comprises performing bilinear interpolation.

20. The fast search method according to claim 16, wherein said determining said second minimum MAD location further comprises comparing said MAD values with said integer pixel value to determine the lowest MAD value.

21. A method of obtaining a motion vector having sub-integer pixel accuracy representing the displacement between a first macroblock contained in a first frame of video image data and a second macroblock contained in a second frame of video image data comprising:

at an integer pixel location having a lowest mean of absolute difference ("MAD") value in the second frame relative to the first frame, determining a first offset in a first direction, relative to said integer pixel location, to a first minimum MAD location having a lowest first direction MAD value;

determining a second offset in a second direction, relative to said first minimum MAD location, to a second minimum MAD location having a lowest second direction MAD value; and determining said motion vector using said integer pixel location and said second minimum MAD location, and without determining values for sub-integer pixel locations other than those associated with determining said first and said second offsets.

22. A method of obtaining a motion vector having sub-integer pixel accuracy representing the displacement between a first macroblock contained in a first frame of video image data and a second macroblock contained in a second frame of video image data comprising:

at an integer pixel location having a lowest mean of absolute difference ("MAD") value in the second frame relative to the first frame, determining a first offset in a first diagonal direction, relative to said integer pixel location, to a first minimum MAD location having a lowest first direction MAD value;

determining a second offset in a second diagonal direction, relative to said first minimum MAD location, to a second minimum MAD location having a lowest second direction MAD value; and determining said motion vector using said integer pixel location and said second minimum MAD location, and without determining values for sub-integer pixel locations other than those associated with determining said first and said second offsets.

23. A method of obtaining a motion vector having sub-integer pixel accuracy representing the displacement between a first macroblock contained in a first frame of video image data and a second macroblock contained in a second frame of video image data in a video recorder, the method comprising:

determining an integer pixel location having a lowest mean of absolute difference ("MAD") value in the second frame relative to the first frame;

determining a first offset in a first direction, relative to said integer pixel location, to a first minimum MAD location having a lowest first direction MAD value;

determining a second offset in a second direction, relative to said first minimum MAD location, having a lowest second direction MAD value;

determining said motion vector using said integer pixel location and said second minimum MAD location, and without determining values for sub-integer pixel locations other than those associated with determining said first and said second offsets; and storing said motion vector on a storage device.

24. The fast search method according to claim 18 further comprising:

positioning said integer pixel location at a point (0.0,0.0), representing a pixel location with no pixel offset on said x-axis and no pixel offset on said y-axis;

positioning said first half-pixel location at a point (−0.5, 0.0), representing a pixel location with a negative half-pixel offset on said x-axis and no pixel offset on said y-axis;

positioning said second half-pixel location at a point (0.5, 0.0), representing a pixel location with a positive half-pixel offset on said x-axis and no pixel offset on said y-axis;

positioning said third half-pixel location at a point (0.0,−0.5), representing a pixel location with no pixel offset on said x-axis and a negative half-pixel offset on said y-axis; and positioning said fourth half-pixel location at a point (0.0, 0.5), representing a pixel location with no pixel offset on said x-axis and a positive half-pixel offset on said y-axis.

25. The fast search method according to claim 18 further comprising:

positioning said integer pixel location at a point (0.0,0.0), representing a pixel location with no pixel offset on said x-axis and no pixel offset on said y-axis;

positioning said first half-pixel location at a point (−0.5,−0.5), representing a pixel location with a negative half-pixel offset on said x-axis and a negative half-pixel offset on said y-axis;

positioning said second half-pixel location at a point (0.5, 0.5), representing a pixel location with a positive half-pixel offset on said x-axis and a positive half-pixel offset on said y-axis;

positioning said third half-pixel location at a point (−0.5, 0.5), representing a pixel location with a negative half-pixel offset on said x-axis and a positive half-pixel offset on said y-axis; and positioning said fourth half-pixel location at a point (0.5,−0.5), representing a pixel location with a positive half-pixel offset on said x-axis and a negative half-pixel offset on said y-axis.

26. A fast search method for obtaining a motion vector having half-pixel accuracy representing the displacement between successive frames of video image data, comprising:
- determining a first macroblock of a first frame comprising a plurality of pixels arranged in a two-dimensional array;
- selecting a second macroblock of a second frame comprising a plurality of pixels arranged in a two-dimensional array having the lowest mean of absolute differences ("MAD") value between said first and said second macroblocks;
- determining an integer pixel location having the lowest MAD value in said second macroblock;
- calculating a half-pixel value at each of a first and a second half-pixel locations in a first direction relative to said integer pixel location, wherein said first and said second half-pixel values are conjugally related;
- determining a MAD value at each of said first and said second half-pixel locations;
- comparing said MAD values of said first and said second half-pixel locations and said integer pixel location to determine a first minimum MAD location having a lowest first direction MAD value;
- calculating a half-pixel value at each of a third and a fourth half-pixel locations in a second direction relative to said integer pixel location, wherein said third and said fourth half-pixel values are conjugally related;
- determining a MAD value at each of said third and said fourth half-pixel locations;
- comparing said MAD values of said third and said fourth half-pixel locations and said integer pixel location to determine a second minimum MAD location having a lowest second direction MAD value; and
- determining said motion vector using said integer pixel location and a sub-integer pixel location, wherein said sub-integer pixel location is obtained by combining said first and said second offsets and without using offsets other than said first and said second offsets, and without determining values for sub-integer pixel locations other than those associated with determining said first and said second offsets.

27. A method of obtaining a motion vector having sub-integer pixel accuracy representing the displacement between a first macroblock contained in a first frame of video image data and a second macroblock contained in a second frame of video image data consisting essentially of:
- determining an integer pixel location having a lowest mean of absolute difference ("MAD") value in said second frame relative to said first frame;
- determining a first offset in a first direction, relative to said integer pixel location, to a first minimum MAD location having a lowest first direction MAD value;
- determining a second offset in a second direction, relative to said integer pixel location, to a second minimum MAD location having a lowest second direction MAD value; and
- determining said motion vector using said integer pixel location and a sub-integer pixel location, wherein said sub-integer pixel location is obtained by combining said first and said second offsets, and without determining values for sub-integer pixel locations other than those associated with determining said first and said second offsets.

28. An apparatus for obtaining a motion vector having sub-integer pixel accuracy representing the displacement between a first frame of video image data and a second frame of video image data consisting essentially of:
- a processor interconnected with a computer-readable medium encoded with computer-executable instructions, said computer-executable instructions configured, when executed by said processor, to perform:
- determining an integer pixel location having a lowest mean of absolute difference ("MAD") value in said second frame relative to said first frame;
- determining a first offset in a first direction, relative to said integer pixel location, to a first minimum MAD location having a lowest first direction MAD value;
- determining a second offset in a second direction, relative to said integer pixel location, to a second minimum MAD location having a lowest second direction MAD value; and
- determining said motion vector using said integer pixel location and a sub-integer pixel location, wherein said sub-integer pixel location is obtained by combining said first and said second offsets, and without determining values for sub-integer pixel locations other than those associated with determining said first and said second offsets.

29. A computer-readable medium encoded with computer-executable instructions for obtaining a motion vector having sub-integer pixel accuracy representing the displacement between a first macroblock contained in a first frame of video image data and a second macroblock contained in a second frame of video image data, said computer-executable instructions consisting essentially of:
- a component configured to determine an integer pixel location having a lowest mean of absolute difference ("MAD") value in said second frame relative to said first frame;
- a component configured to identify a first offset in a first direction, relative to said integer pixel location, to a first minimum MAD location having a lowest first direction MAD value;
- a component configured to identify a second offset in a second direction, relative to said integer pixel location, to a second minimum MAD location having a lowest second direction MAD value; and
- a component configured to determine said motion vector using said integer pixel location and a sub-integer pixel location, wherein said sub-integer pixel location is obtained by combining said first and said second offsets, and without determining values for sub-integer pixel locations other than those associated with determining said first and said second offsets.

30. A device for obtaining a motion vector having sub-integer pixel accuracy representing the displacement between a first macroblock contained in a first frame of video image data and a second macroblock contained in a second frame of video image data consisting essentially of:
- a component configured to determine an integer pixel location having a lowest mean of absolute difference ("MAD") value in the second frame relative to the first frame;
- a component configured to identify a first offset in a first direction, relative to said integer pixel location, having a lowest first direction MAD value;
- a component configured to identify a second offset in a second direction, relative to said integer pixel location, having a lowest second direction MAD value; and a component configured to determine said motion vector using said integer pixel location and a sub-integer pixel location, wherein said sub-integer pixel location is obtained by combining said first and said second offsets, and without determining values for sub-integer pixel locations other than those associated with determining said first and said second offsets.

31. A fast search method for obtaining a motion vector having half-pixel accuracy representing the displacement between successive frames of video image data, consisting essentially of:

determining a first macroblock of a first frame comprising a plurality of pixels arranged in a two-dimensional array;
   selecting a second macroblock of a second frame comprising a plurality of pixels arranged in a two-dimensional array having the lowest mean of absolute differences ("MAD") value between said first and said second macroblocks;
   determining an integer pixel location having the lowest MAD value in said second macroblock;
   calculating a half-pixel value at each of a first and a second half-pixel locations in a first direction relative to said integer pixel location, wherein said first and said second half-pixel values are conjugally related;
   determining a MAD value at each of said first and said second half-pixel locations;
   comparing said MAD values of said first and said second half-pixel locations and said integer pixel location to determine a first minimum MAD location having a lowest first direction MAD value;
   calculating a half-pixel value at each of a third and a fourth half-pixel locations in a second direction relative to said first minimum MAD location, wherein said third and said fourth half-pixel values are conjugally related;
   determining a MAD value at each of said third and said fourth half-pixel locations;
   comparing said MAD values of said third and said fourth half-pixel locations and said first minimum MAD location to determine a second minimum MAD location having a lowest second direction MAD value; and
   determining said motion vector using said integer pixel location and a sub-integer pixel location, wherein said sub-integer pixel location is said second minimum MAD location.

32. A method of obtaining a motion vector having sub-integer pixel accuracy representing the displacement between a first macroblock contained in a first frame of video image data and a second macroblock contained in a second frame of video image data consisting essentially of:

determining an integer pixel location having a lowest mean of absolute difference ("MAD") value in the second frame relative to the first frame;
   determining a first offset in a first direction, relative to said integer pixel location, to a first minimum MAD location having a lowest first direction MAD value;
   determining a second offset in a second direction, relative to said first minimum MAD location, to a second minimum MAD location having a lowest second direction MAD value; and
   determining said motion vector using said integer pixel location and said second minimum MAD location, and without determining values for sub-integer pixel locations other than those associated with determining said first and said second offsets.

33. A method of obtaining a motion vector having sub-integer pixel accuracy representing the displacement between a first macroblock contained in a first frame of video image data and a second macroblock contained in a second frame of video image data consisting essentially of:

determining an integer pixel location having a lowest mean of absolute difference ("MAD") value in the second frame relative to the first frame;
   determining a first offset in a first diagonal direction, relative to said integer pixel location, to a first minimum MAD location having a lowest first direction MAD value;
   determining a second offset in a second diagonal direction, relative to said first minimum MAD location, to a second minimum MAD location having a lowest second direction MAD value; and
   determining said motion vector using said integer pixel location and said second minimum MAD location, and without determining values for sub-integer pixel locations other than those associated with determining said first and said second offsets.

34. A method of obtaining a motion vector having sub-integer pixel accuracy representing the displacement between a first macroblock contained in a first frame of video image data and a second macroblock contained in a second frame of video image data in a video recorder, the method consisting essentially of:

determining an integer pixel location having a lowest mean of absolute difference ("MAD") value in the second frame relative to the first frame;
   determining a first offset in a first direction, relative to said integer pixel location, to a first minimum MAD location having a lowest first direction MAD value;
   determining a second offset in a second direction, relative to said first minimum MAD location, having a lowest second direction MAD value;
   determining said motion vector using said integer pixel location and said second minimum MAD location, and without determining values for sub-integer pixel locations other than those associated with determining said first and said second offsets; and
   storing said motion vector on a storage device.

35. A fast search method for obtaining a motion vector having half-pixel accuracy representing the displacement between successive frames of video image data, consisting essentially of:

determining a first macroblock of a first frame comprising a plurality of pixels arranged in a two-dimensional array;
   selecting a second macroblock of a second frame comprising a plurality of pixels arranged in a two-dimensional array having the lowest mean of absolute differences ("MAD") value between said first and said second macroblocks;
   determining an integer pixel location having the lowest MAD value in said second macroblock;
   calculating a half-pixel value at each of a first and a second half-pixel locations in a first direction relative to said integer pixel location, wherein said first and said second half-pixel values are conjugally related;
   determining a MAD value at each of said first and said second half-pixel locations;
   comparing said MAD values of said first and said second half-pixel locations and said integer pixel location to determine a first minimum MAD location having a lowest first direction MAD value;
   calculating a half-pixel value at each of a third and a fourth half-pixel locations in a second direction relative to said first minimum MAD location, wherein said third and said fourth half-pixel values are conjugally related;

determining a MAD value at each of said third and said fourth half-pixel locations;

comparing said MAD values of said third and said fourth half-pixel locations and said first minimum MAD location to determine a second minimum MAD location having a lowest second direction MAD value; and determining said motion vector using said integer pixel location and a sub-integer pixel location, wherein said sub-integer pixel location is obtained by combining said first and said second offsets and without using offsets other than said first and said second offsets, and without determining values for sub-integer pixel locations other than those associated with determining said first and said second offsets.

36. An apparatus for obtaining a motion vector having sub-integer pixel accuracy representing the displacement between a first frame of video image data and a second frame of video image data comprising:

a processor interconnected with a computer-readable medium encoded with computer-executable instructions, said computer-executable instructions configured, when executed by said processor, to access video image data to perform:

determining an integer pixel location having a lowest mean of absolute difference ("MAD") value in said second frame relative to said first frame;

determining a first offset in a first direction, relative to said integer pixel location, to a first minimum MAD location having a lowest first direction MAD value, comprising:

performing interpolation to determine a half-pixel value at each of a first and a second half-pixel locations in said first direction relative to said integer pixel location, wherein said first and said second half-pixel values are conjugally related;

determining a MAD value at each of said first and said second half-pixel locations;

comparing said MAD values of said first and said second half-pixel locations and said integer pixel location to determine said first minimum MAD location; and calculating said first offset as the difference between said first minimum MAD location and said integer pixel location;

determining a second offset in a second direction, relative to said first minimum MAD location, to a second minimum MAD location having a lowest second direction MAD value, comprising:

performing interpolation to determine a half-pixel value at each of a first and a second half-pixel locations in said second direction relative to said first minimum MAD location, wherein said first and said second half-pixel values are conjugally related;

determining a MAD value at each of said first and said second half-pixel locations;

comparing said MAD values of said first and said second half-pixel locations and said first minimum MAD location to determine said second minimum MAD location; and calculating said second offset as the difference between said first and said second minimum MAD locations; and determining said motion vector using said integer pixel location and a sub-integer pixel location, wherein said sub-integer pixel location is obtained by combining said first and said second offsets and without using offsets other than said first and said second offsets, and without determining values for sub-integer pixel locations other than those associated with determining said first and said second offsets.

37. A computer-readable medium encoded with computer-executable instructions for obtaining a motion vector having sub-integer pixel accuracy representing the displacement between a first macroblock contained in a first frame of video image data and a second macroblock contained in a second frame of video image data, said computer-executable instructions comprising:

a first component configured to determine, with respect to an integer pixel location having a lowest mean of absolute difference ("MAD") value in said second frame relative to said first frame, a first offset in a first direction, relative to said integer pixel location, to a first minimum MAD location having a lowest first direction MAD value, wherein said first component further comprises:

a component configured to perform interpolation to determine a half-pixel value at each of a first and a second half-pixel locations in said first direction relative to said integer pixel location, wherein said first and said second half-pixel values are conjugally related;

a component configured to determine a MAD value at each of said first and said second half-pixel locations;

a component configured to compare said MAD values of said first and said second half-pixel locations and said integer pixel location to determine said first minimum MAD location; and a component configured to calculate said first offset as the difference between said first minimum MAD location and said integer pixel location;

a second component configured to identify a second offset in a second direction, relative to said first minimum MAD location, to a second minimum MAD location having a lowest second direction MAD value, wherein said second component further comprises:

a component configured to perform interpolation to determine a half-pixel value at each of a third and a fourth half-pixel locations in said second direction relative to said first minimum MAD location, wherein said first and said second half-pixel values are conjugally related;

a component configured to determine a MAD value at each of said third and said fourth half-pixel locations;

a component configured to compare said MAD values of said third and said fourth half-pixel locations and said first minimum MAD location to determine said second minimum MAD location; and a component configured to calculate said second offset as the difference between said first and said second minimum MAD locations; and a third component configured to determine said motion vector using said integer pixel location and a sub-integer pixel location, wherein said sub-integer pixel location is obtained by combining said first and said second offsets and without using offsets other than said first and said second offsets, and without determining values for sub-integer pixel locations other than those associated with determining said first and said second offsets.

38. A device for obtaining a motion vector having sub-integer pixel accuracy representing the displacement between a first macroblock contained in a first frame of video image data and a second macroblock contained in a second frame of video image data comprising:

a first component configured to determine, with respect to an integer pixel location having a lowest mean of absolute difference ("MAD") value in the second frame relative to the first frame, a first offset in a first direction, relative to said integer pixel location, having a lowest first direction MAD value, wherein said first component further comprises:
  a component configured to perform interpolation to determine a half-pixel value at each of a first and a second half-pixel locations in said first direction relative to said integer pixel location, wherein said first and said second half-pixel values are conjugally related;
  a component configured to determine a MAD value at each of said first and said second half-pixel locations; and
  a component configured to compare said MAD values of said first and said second half-pixel locations and said integer pixel location to determine said first minimum MAD location;
a second component configured to identify a second offset in a second direction, relative to said first minimum MAD location, having a lowest second direction MAD value, wherein said second component further comprises:
  a component configured to perform interpolation to determine a half-pixel value at each of a third and a fourth half-pixel locations in said second direction relative to said first minimum MAD location, wherein said third and said fourth half-pixel values are conjugally related;
  a component configured to determine a MAD value at each of said third and said fourth half-pixel locations; and
  a component configured to compare said MAD values of said third and said fourth half-pixel locations and said first minimum MAD location to determine said second minimum MAD location; and
a third component configured to determine said motion vector using said integer pixel location and a sub-integer pixel location, wherein said sub-integer pixel location is obtained by combining said first offset and said second offset and without using offsets other than said first and said second offsets, and without determining values for sub-integer pixel locations other than those associated with determining said first and said second offsets.

* * * * *